United States Patent [19]

Erell et al.

[11] Patent Number: 5,778,342

[45] Date of Patent: Jul. 7, 1998

[54] PATTERN RECOGNITION SYSTEM AND METHOD

[75] Inventors: Adoram Erell, Herzelia; David Burshtein, Tel Aviv, both of Israel

[73] Assignee: DSPC Israel Ltd., Givat Shmuel, Israel

[21] Appl. No.: 595,357

[22] Filed: Feb. 1, 1996

[51] Int. Cl.$^6$ ................................................. G10L 5/06
[52] U.S. Cl. .......................... 704/256; 704/241; 704/260; 704/236
[58] Field of Search ..................... 395/2.4, 2.45, 395/2.5, 2.52, 2.53, 2.48; 704/200, 231, 236, 239, 241–247

[56] References Cited

U.S. PATENT DOCUMENTS

| 4,718,088 | 1/1988 | Baker et al. | 395/2.5 |
|---|---|---|---|
| 5,528,725 | 6/1996 | Hui | 395/2.45 |
| 5,579,436 | 11/1996 | Chou et al. | 395/2.53 |

OTHER PUBLICATIONS

L.R. Rabiner et al., "Digital Processing of Speech Signals", Prentice Hall, Chapter 8.

P. Wallich, "Putting Speech Recognizers to Work", IEEE Spectrum, Apr. 1987, pp. 55–57.

L.R. Rabiner et al., "A Model–Based Connected Digit Recognizer Using Either Hidden Markov Models or Templates", Computer Speech and Language (1986), vol. 1, pp. 167–197.

J.H.L. Hansen et al., "Constrained Iterative Speech Enhancement with Application to Automatic Speech Recognition", IEEE 1988, pp. 561–564.

Y. Ephraim et al., "A Linear Predictive Front–End Processor for Speech Recognition in Noisy Environments", IEEE 1987, pp. 1324–1327.

I. Sanchez et al., "Improved Speech Recognition through the Use of Noise–Compensated Hiddem Markov Models", ICSPAT, Boston, Oct. 1995, pp. 1998–2002.

A.D. Berstein et al., "An Hypothesized Wiener Filtering Approach to Noise Speech Recognition", IEEE 1991, pp. 913–916.

B.A. Mellor et al., "Noise Masking in a Transform Domain", BCC 1993, pp. II–87–II–90.

J.N. Holmes et al., "Noise Compensation for Speech Recognition Using Probabilistic Models", ICASSP 1986, Tokyo, pp. 741–744.

R. Yang et al., "Noise Compensation for Speech Recognition in Car Noise Environments", IEEE 1995, pp. 433–436.

D.H. Klatt, "A Digital Filter Bank for Spectral Matching", ICASSP 1979, pp. 573–576.

J.S. Bridle et al., "A Noise Compensating Spectrum Distance Measure Applied to Automatic Speech Recognition", Proc. I.O.A., vol. 6, Part 4, 1984, pp. 307–314.

A. Varga et al., "Control Experiments on Noise Compensation in Hidden Markov Model Based Continuous Word Recognition", Eurospeech 89, vol. 1, Paris, Sep. 1989, pp. 167–170.

Primary Examiner—Tariq R. Hafiz
Attorney, Agent, or Firm—Wilson Sonsini Goodrich & Rosati

[57] ABSTRACT

A pattern recognition system and method is disclosed. The method includes the steps of a) providing a noisy test feature set of the input signal, a plurality of reference feature sets of reference templates produced in a quiet environment, and a background noise feature set of background noise present in the input signal, b) producing adapted reference templates from the test feature set, the background noise feature set and the reference feature sets and c) determining match scores defining the match between each of the adapted reference templates and the test feature set. The method can also include adapting the scores before accepting a score as the result. The system and method are descried for both Hidden Markov Model (HMM) and Dynamic Time Warping (DTW) scoring units. The system performs the steps of the method.

18 Claims, 3 Drawing Sheets

PATTERN RECOGNITION SYSTEM AND METHOD

FIELD OF THE INVENTION

The present invention relates to pattern recognition generally and to speech recognition in adverse background noise conditions in particular.

BACKGROUND OF THE INVENTION

Prior art speech recognition systems analyze a voice signal and compare it to stored speech patterns in order to determine what was said. When the stored speech patterns and the voice signal under analysis are acquired in different environments the pattern similarity is corrupted by the unmatched conditions which effect leads to recognition errors.

Prior art speech recognizers typically implement supervised learning, or training, in order to provide stored speech patterns. Supervised learning is performed in a "clean" environment (e.g. one with little or no background noise).

In the training phase, a speech recognizer "learns" a reference vocabulary by digitally storing a set of patterns, known as templates, representing acoustical features of the words conforming to the vocabulary.

A testing phase, during which words to be recognized are spoken, known as test utterances, is performed in a natural environment which is typically noisy. During the phase, the acoustical features of the word to be recognized are extracted and compared with those of each template. By selecting the template(s) showing the maximum similarity, a decision about the utterance being tested can be reached.

Speech is a non-stationary process and therefore, speech recognizers segment spoken words into time frames of approximately 20 to 30 msec. These time frames are typically assumed to be stationary.

The acoustical features, mentioned hereinabove, are typically extracted from each frame and are combined together into a feature set, or feature vector, for each frame. The most commonly used features are the coefficients of an autoregressive model or a transformation of them. Typical features include the Linear Prediction Coefficients, Cepstrum coefficients, Bank of filter energies, etc. In general, feature sets reflect vocal tract characteristics.

Short time spectral estimations of segments of speech can be obtained from such sets of coefficients according to methods known in the art.

A detailed description of different sets of features may be found in "Digital Processing of Speech Signals" by L. R. Rabiner et al., Prentice Hall, Chapter 8.

Speech Recognition systems can be classified as follows: Isolated Word Recognition, Connected Speech Recognition and Continuous Speech Recognition. Alternatively, they can be classified as Speaker Dependent systems which require the user to train the system which utilize data bases containing speech of many speakers. A description of many available systems can be found in "Putting Speech Recognizers to Work", P. Wallich, IEEE Spectrum, April 1987, pp. 55–57.

There are many approaches to recognizing speech. The Dynamic Programming approach, as described in U.S. Pat. No. 4,488,243 to Brown et al, stores a feature vector for each time frame and the entirety of feature vectors are utilized as a time series of vectors. Through a dynamic programming algorithm, the Dynamic Programming approach identifies the best match between an uttered word, known as the test utterance, and a given set of reference word templates. For each reference templates, the algorithm determines a global similarity score between the test utterance and the reference template. The test utterance is identified by the reference template which yields the highest similarity score.

In a Hidden Markov Model (HMM) approach, each reference word is represented by a model consisting of a sequence of states, each characterized by a probability distribution. In the recognition procedure, a dynamic programming algorithm is applied to find the best match between the test utterance feature vectors and the reference word states. A probability that the test feature vectors correspond to the given reference template is computed. The test utterance is identified as the reference word which yields the greatest probability.

All of these methods may be extended to the recognition of connected or continuous speech by finding a sequence of reference templates which best match the connected speech test utterance in the sense that it provides a best global similarity score. A global similarity score algorithm is described in the article "A Model Based Connected Digit Recognizer Using Either Hidden Markov Models or Templates", by L. R. Rabiner, J. G. Wilpon, and B. H. Juang, published in *Computer Speech and Language*, Vol. 1, Dec. 1986, pp. 167–197.

Another similar application of the abovementioned methods is for speech verification in which the global similarity score is compared to a threshold to determine whether or not the test utterance contains a given reference word or words.

In the methods outlined above, there is a similarity measurement between feature vectors of the test utterance and feature vectors stored as templates or models. This measurement, often called a local distance or local distortion measure, is strongly affected by the presence of noise, or more precisely, by differences in the background noise characteristics of the training and testing phases.

Prior art speech recognition systems resolve the problem by training in a "clean" environment and by applying speech enhancement techniques to the noisy test words in order to input to the recognition system noise reduces utterances. For example J. H. L. Hansen and Mark A. Clements, in "Constrained Iterative Speech Enhancement with Applications to Automatic Speech Recognition", published in *Proceedings of the International Conference on Acoustics, Speech and Signal Processing* 1988, pp.561–564, disclose a preprocessor that "would produce speech or recognition features which are less sensitive to background noise so that existing recognition system may be employed".

A similar approach is offered by Y. Ephraim et al. in "A Linear Predictive Front-End processor for Speech Recognition in Noisy Environments", *Proceedings of the International Conference on Acoustics, Speech and Signal Processing* 1987, pp.1324–1327. Their system "takes into account the noise presence in estimating the feature vector" in order "to make existing speech recognition systems, which have proved to perform successfully in a laboratory environment, immune to noise".

It is also known to noise adapt the templates to the current noise level. The word templates are adapted to noise by adding an estimated noise power spectrum to the template sequence of power spectra. The power spectra is computed via a fast fourier transform (FFT). Such methods are described in the following articles:

D. H. Klatt, "A Digital Filter Bank for Spectral Matching", ICASSP'79, pp. 573–576;

Bridle et al., "A Noise Compensating Spectrum Distance Measure Applied to Automatic Speech Recognition", Proc. Inst. Acoust., Autumn Meeting, Windermere, Great Britain, Nov. 1984;

J. N. Holmes and N. Sedgwick, "Noise Compensation for Speech Recognition Using Probabilistic Models", ICASSP'86, pp. 913–916;

B. A. Mellor and A. P. Varga, "Noise Masking in a Transform Domain", ICASSP'93, pp.II-87–II-90;

Yang and P. Haavisto, "Noise Compensation for Speech Recognition in Car Noise Environment", ICASSP'95, pp. 443–436; and I. Sanches and D. M. Brookes, "Improved Speech Recognition Through the Use of Noise-compensated Hidden Markov Models", ICSPAT, Boston, Oct. 1995, pp. 1998–2002.

A further article, "An Hypothesized Wiener Filter Approach to Noisy Speech Recognition" by A. Berstein and I. Shalom, ICASSP '91, pp. 913–916, describes a series of Wiener filters built using the hypothesized clean template which are applied to the feature vectors of the noisy word.

SUMMARY OF THE PRESENT INVENTION

It is therefore an object of the present invention to

A pattern recognition system and method is disclosed. The method includes the steps of a) providing a noisy test feature set of the input signal, a plurality of reference feature sets of reference templates produced in a quiet environment, and a background noise feature set of background noise present in the input signal, b) producing adapted reference templates from the test feature set, the background noise feature set and the reference feature sets and c) determining match scores defining the match between each of the adapted reference templates and the test feature set. The method can also include adapting the scores before accepting a score as the result. The system and method are described for both Hidden Markov Model (HMM) and Dynamic Time Warping (DTW) scoring units. The system performs the steps of the method.

Additionally, in accordance with a preferred embodiment of the present invention, creating the reference templates, for both the DTW and HMM implementations, involves raising the gain level of a reference feature set to the value of the difference of the average energy of the test feature set and the average energy of the background noise feature set and adjusting the gain-raised reference feature set by the background noise feature set. For the HMM implementation, the adapted reference set includes an adaptation of the current frame of the reference feature set and a "next-frame" reference feature set.

Moreover, in accordance with a preferred embodiment of the present invention, for the DTW implementation, the scores are accepted if the signal to noise ratio and score value are within predetermined values.

Further, in accordance with a preferred embodiment of the present invention, the features sets are autocorrelation feature sets and the global scoring operation operates on cepstral representations of the autocorrelation feature sets. For the HMM implementation, the features sets are autocorrelation feature sets for the current frame and for a next frame.

Still further, in accordance with a preferred embodiment of the present invention, the HMM implementation includes the step of accepting involves selecting a match score which is best in accordance with a predetermined criterion.

Finally, in accordance with a preferred embodiment of the present invention, the system of the present invention performs the steps of the method.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
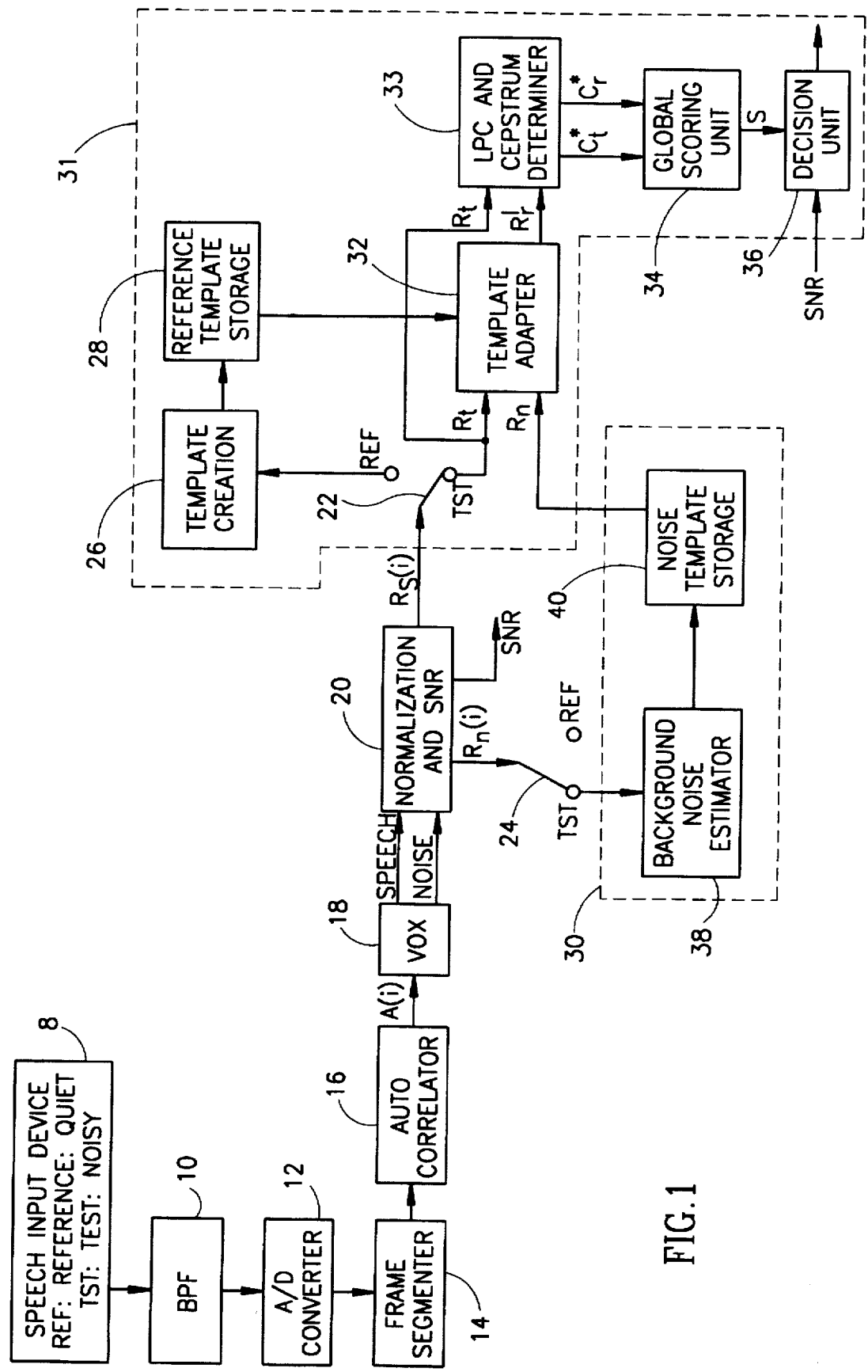
FIG. 1 is a block diagram illustration of a template adapting pattern recognition system adapted to perform Dynamic Time Warping global scoring, constructed and operative in accordance with a preferred embodiment of the present invention.

Reference is now made to FIG. 1 which illustrates, in block diagram form, a pattern recognition system constructed and operative in accordance with the present invention. The pattern recognition system will be described in the context of a speech recognition system, it being understood that any type of pattern can be recognized.

The speech recognition system typically comprises an input device 8, such as a microphone or a telephone handset, for acquiring a speech utterance in a necessarily quiet environment for training (i.e. reference creation) and in a non-necessarily quiet environment for recognition (i.e. test utterance).

The system additionally comprises a band pass filter 10 for receiving the speech utterance and for eliminating from the speech utterance frequencies below a first frequency, typically of 150 Hz, and above a second frequency, typically of 3200 Hz. Typically, band pass filter 10 is also an anti-aliasing filter thereby to enable proper sampling of the speech utterance.

For other types of pattern recognition systems, the input device 8 is any type of input device capable of receiving the reference and test signal. In such systems, devices capable of conditioning the input and preparing it for analog to digital conversion are typically substituted for the band pass filter 10.

The speech recognition system additionally comprises an Analog-to-Digital Converter (ADC) 12 for sampling the analog band-passed speech utterance, typically at a 8000 Hz sampling rate, and a frame segmenter 14 for segmenting the sampled speech utterance into frames of approximately 30 msec in length.

An autocorrelator 16 determines the autocorrelation coefficients R(i) of the frame, in accordance with standard autocorrelation techniques.

The autocorrelation output is provided to a voice operated switch (VOX) 18 for identifying when no speech utterance is present. The datapoints of the frame which have noise in them will be provided to a background noise estimation unit 30 while the datapoints with speech therein will be provided to a speech processing unit 31.

A suitable VOX 18 is described in U.S. Pat. No. 4,959,865 to Stettiner et al. For other pattern recognition systems, VOX 18 is typically replaced by a suitable detector typically for detecting the moment that the signal energy rises above a background noise level.

The speech and noise segments are provided to a signal strength unit 20 which determines the signal to noise ratio of the speech segment.

A switch 22, operated together with a switch 24, switches the system between reference and test modes. In the reference mode (switch position REF) the system learns a predetermined set of template patterns.

In the test mode (switch position TST), the system operates on a test utterance. Because switch 24 is connected to the background noise estimation unit 30, which is operative only during the test mode, when switch 22 is positioned in the R position, switch 24 is forced to be open, as shown in FIG. 1.

It will be noted that switches 22 and 24 are for illustration only; they depict the connections between different steps performed by a microprocessor, described in more detail hereinbelow with respect to FIG. 4, and are typically implemented in software.

For the reference mode, the system comprises a template creation block 26 for creating reference templates from the auto correlation coefficients $R_r(I)$ and a reference template storage block 28 for storing the reference templates until they are needed.

Template creation block 26 first normalizes the autocorrelation coefficients $R_I$ by the average speech energy $<R_r(0)>$ of the reference word, computed between speech endpoints, as follows:

$$R_r(i) => R_r(i)/<R_r(0)>$$

Template creation block 26 then creates the reference templates according to well known techniques, such as Dynamic Time Warping (DTW), Vector Quantization (VQ) or Hidden Markov Model (HMM).

For DTW, reference templates are comprised of a sequence of feature vectors for the entirety of frames forming a spoken word. For VQ, each reference template is represented by a sequence of indices of VQ codewords and for HMM each reference template, also known as a model, is represented by a sequence of probability distributions. For HMM-VQ, the HMM model is based on a VQ codebook, which is common to all templates.

When switch 18 is set to test mode (TST position), switch 24 is automatically closed and input speech is acquired in a typically noisy environment.

In accordance with a preferred embodiment of the present invention, for the test mode, the system additionally comprises the background noise estimation unit 30, a template adapter 32, an LPC and cepstrum determiner 33, a global scoring unit 34 and a decision unit 36. The background noise estimation unit 30 estimates the spectral properties of the background noise. The template adapter 32 adapts the reference template, denoted $R_r$ to the particular additive noise present in the current test. The LPC and cepstrum determiner 33 converts the adapted reference template, denoted $R_r'$, and the test feature set, denoted $R_t$, to the cepstral format and determines the linear prediction (LPC) coefficients associated therewith. The global scoring unit 34 produces a global score for the similarity of the adapted reference template $R_r'$ and the test utterance $R_t$. The decision unit 36 adapts the global score in accordance with the level of the signal to noise ratio produced by unit 20.

The following discussion will describe the operation of the present invention for a global scoring 34 performing DTW. Afterwards, the operation will be described for one performing HMM.

The background noise estimation unit comprises a background noise estimator 38 for estimating noise characteristics of noise present between words (i.e. when no speech is present) and for computing a noise feature vector, and a noise template storage unit 40 for storing the computed noise template for later utilization by template.

The background noise estimator 38 is typically an averager which produces, as the noise feature vector, the average value of an AutoCorrelation Function (ACF) of the input signal of the frames having no speech activity. The noise feature vector is the noise template. In particular, the background noise feature vector, denoted $R_n$, is evaluated whenever there is background noise only, typically both before and after a speech utterance is spoken.

For each noisy speech frame under test, template adapter 32 takes as input the speech feature vector $R_t$ of the noisy speech frame, the stored background noise template $R_n$ and a frame $R_r$ of the reference template whose similarity to the speech feature vector is to be measured.

The template adapter then adapts the normalized reference template. Specifically, the gain level for the reference template $R_r$ is raised to the value of the difference of the average energy of the test utterance and the average energy of the noise signal. In addition, the reference template $R_r$ is adjusted by the noise template. Mathematically, the adapted reference template $R_r'$ is defined as:

$$R_r' = (<R_t(0)> - R_n(0))R_r + R_n \quad (2)$$

where $<R_t(0)>$ is the average speech energy of the test word computed between speech endpoints and $R_n(0)$ is the energy in the noise signal as denoted by the first autocorrelation element.

The adapted reference template $R_r'$ and the test utterance $R_t$ are provided to determiner 33 which performs a linear prediction coding (LPC) analysis thereon using the autocorrelation method, as described in Chapter 8 of the book *Digital Processing of Speech Signals*, by L. Rabiner and Schaffer, published by Prentice Hall, Inc., Englewood Cliffs, N.Y., 1978. The book is incorporated herein by reference.

From the p LPC coefficients α for each feature vector, unit 33 determines the associated cepstrum coefficients $C_r'$ and $C_t$. The conversion process is as follows:

$$C_i = \alpha_i - \sum_{k=0}^{i-1} \frac{k}{i} C_k \alpha_{i-k}, i = 1, p \quad (3)$$

where p typically has a value of 10.

The feature vectors, denoted C*, which determiner 33 provides to the global scoring unit 34 also include the base-2 logarithm of the energy of the zeroth component R(O) of the autocorrelation of each signal. Thus:

$$C_r^* = [\log_2 R_r'(0), C_r'(1), \ldots C_r'(p)] \quad (4)$$

$$C_t^* = [\log_2 R_t(0), C_t(1), \ldots C_t(p)] \quad (5)$$

The cepstrum coefficients $C_r^*$ and $C_t^*$ are provided to the global scoring unit 34 which produces a local similarity measure S between the adapted reference template and the test utterance.

In the DTW approach, a warping function giving the best time alignment between two sequences of features is searched. A global distance accumulating the local distances over the warping function represents the similarity between the words. A detailed explanation of the DTW algorithm can be found in the article, incorporated herein by reference, by H. Sakoe and S. Chiba entitled "Dynamic Programming Algorithm Optimization for Spoken Word Recognition:", *IEEE Transactions on Acoustics, Speech and Signal Processing*, Vol. 26, 1978, pp.43–49.

The global similarity score S between the current reference template and the spoken word is saved and the process repeated using the next reference template. When the comparison of the entirety of reference templates is completed, the reference template most similar to the spoken word is selected as the recognized word, wherein the term "most similar" is defined as is known for DTW algorithms. The recognized word and its score S are provided to the decision unit 36.

The decision unit 36 rejects recognized words whose recognition score S is too poor. Unit 36 has a noise-adapted acceptance criterion which is a function of the score level and of the signal to noise ratio (SNR) of the speech segment, as provided by unit 20.

Figure 2:
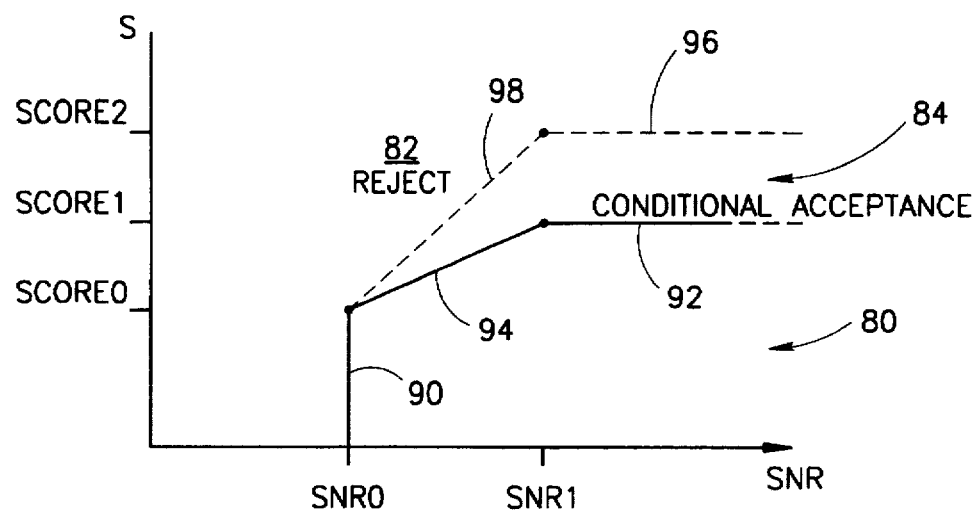
FIG. 2 is a graphical illustration of the conditions for acceptance of a result, useful in the system of FIG. 1.

FIG. 2 illustrates the acceptance criterion and is a graph of the score value versus SNR. The graph of FIG. 2 is divided into three sections, an acceptance area 80, a rejection area 82 and a conditional acceptance area 84. Furthermore, there are two SNR thresholds, SNR0 and SNR1, and three score thresholds, SCORE0, SCORE1 and SCORE2.

The acceptance area 80 is bounded by the line 90 at SNR=SNR0 ending at the point (SNR0, SCORE0), the line 92 at S=SCORE1 beginning at the point (SNR1, SCORE1) and the line 94 connecting the two points (SNR0, SCORE0) and (SNR1, SCORE1).

The conditional acceptance area 84 accepts a score on the condition that the two templates with the best scores for that word are of the same word. The lower bound of conditional acceptance area 84 is defined by the lines 94 and 92, and the upper bound of area 84 is defined by lines 96 and 98, where line 96 is at S=SCORE2 beginning at the point (SNR1, SCORE2) and line 98 connects the points (SNR0, SCORE0) and (SNR1, SCORE2). Any other scores are to be rejected indicating that no reference template could successfully be matched to the test utterance.

It will be appreciated that the reference templates can be any type of template. They can consist of a plurality of different words spoken by one person, for identifying the spoken word or words, or they can consist of average properties of utterances spoken by a plurality of people for identifying the speaker rather than his words. In speech recognition, each template represents a word or portion of a word in the vocabulary to be recognized. In speaker recognition, each template represents the identity of a person. Reference templates are described in the following article, incorporated herein by reference: G. Doddington, "Speaker Recognition: Identifying People by Their Voices, "*Proceedings of the IEEE* No. 73, 1985, pp. 1651–1664.

It will be appreciated that the system of the present invention can alternatively perform connected or continuous speech recognition. In such a system, the global scoring unit 34 will select the best sequence of reference templates which yields the best total similarity score.

Once a positive decision is reached (i.e. no rejection), an output device (not shown), such as a voice actuated device, a communication channel or a storage device, is operated in response to the meaning of the recognized word or words contained in the speech utterance or in response to the identity of the speaker.

Figure 3:
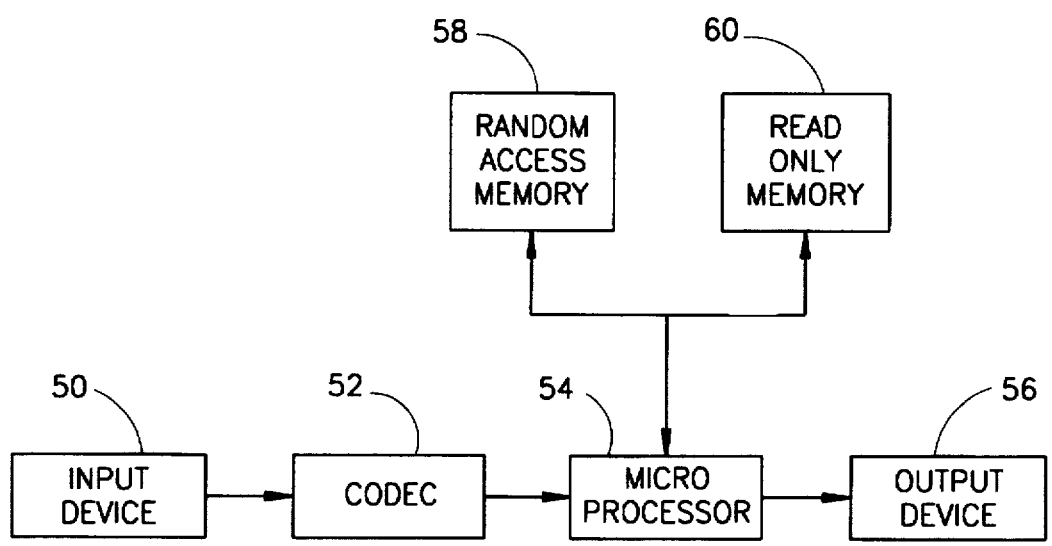
FIG. 3 is a block diagram illustration of the hardware elements which implement the system of FIG. 1.

Reference is now briefly made to FIG. 3 which illustrates a hardware configuration for implementing the block diagram of FIG. 1. The system typically comprises an input device 50 for acquiring a speech utterance or background noise, a COder-DECoder (CODEC) 52 for implementing the band pass filter 10 and the ADC 12, an output device 56 for operating in response to the identified word or words, and a microprocessor 54 for implementing the remaining elements of the block diagram of FIG. 1.

Microprocessor 54 typically works in conjunction with a Random Access Memory (RAM) 58 and a Read Only Memory (ROM) 60, as is known in the art. RAM 58 typically serves to implement reference template storage unit 22 and noise template storage unit 38. ROM 60 is operative to store a computer program which incorporates the method of the present invention. Data and address buses connect the entirety of the elements of FIG. 3 in accordance with conventional digital techniques.

Input device 50 may be, as mentioned hereinabove, a microphone or a telephone handset. CODEC 52 may be a type TCM29c13 integrated circuit made by Texas Instruments Inc., Houston, Tex. RAM 58 may be a type LC3664NML 64K bit Random Access Memory manufactured by Sanyo, Tokyo, Japan. ROM 60 may be a 128K bit Programmable Read Only Memory manufactured by Cypress Semiconductor, San Jose, Calif. Microprocessor 54 may be a TMS320C25 digital signal microprocessor made by Texas Instruments Inc., Houston, Tex. The output device 56 may be a dialing mechanism, a personal computer or any other device to be activated by known voice commands. Alternatively, it may be apparatus for communicating the identified word or words to a communication channel or for storing the identified word or words.

A second embodiment of the invention, which makes use of the Hidden Markov Model global similarity approach, will now be discussed with reference to FIG. 4. Elements of FIG. 4 which are the same as those of FIG. 1 have similar reference numerals and therefore, will not be described hereinbelow. A tutorial description of HMM is given in the paper incorporated herein by reference by L. R. Rabiner, as follows: "A Tutorial on Hidden Markov Models and Selected Applications in Speech Recognition", *Proceedings of the IEEE*, Vol 77, No.2, Feb 89, pp 257–286.

Figure 4:
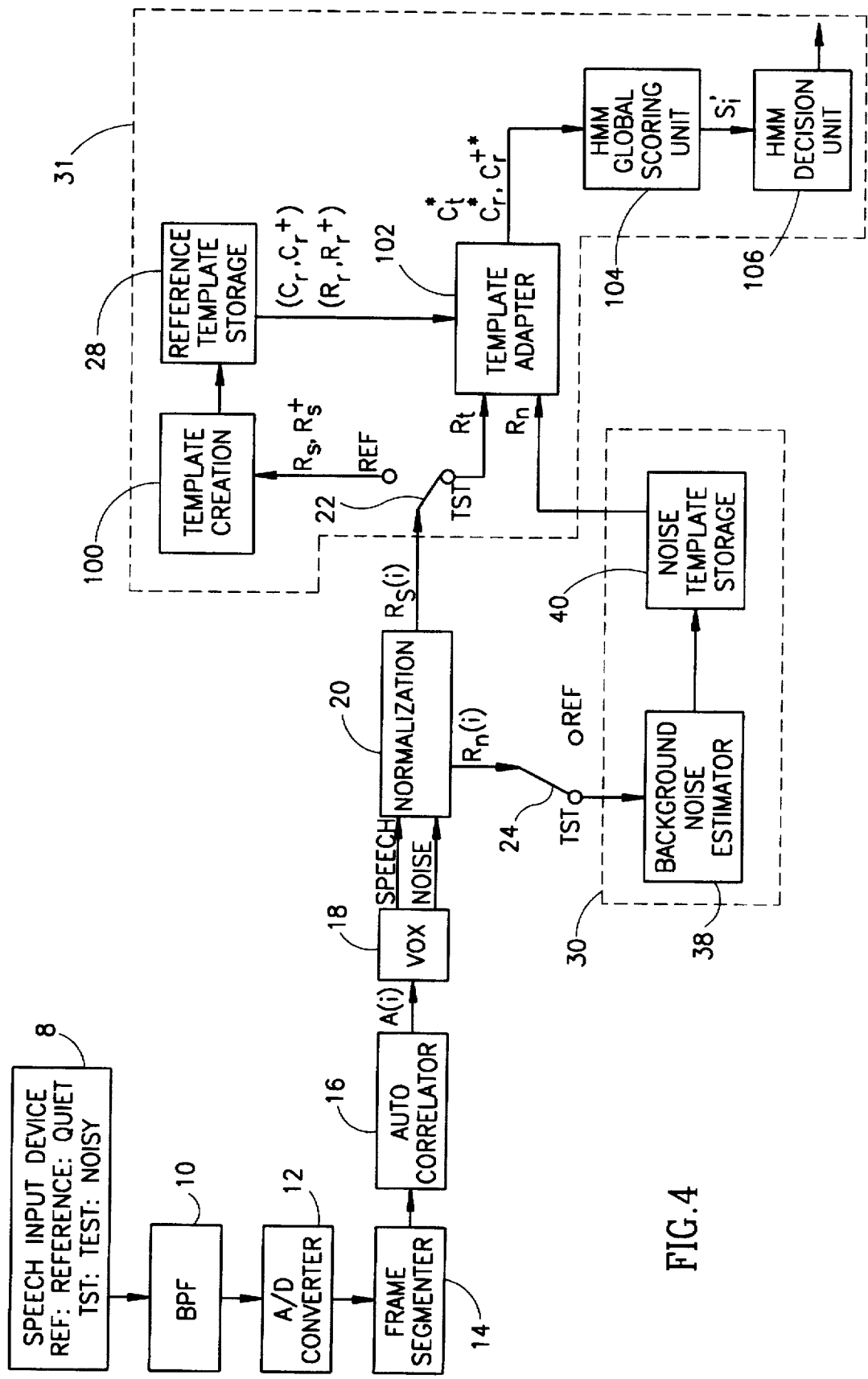
FIG. 4 is a block diagram illustration of an alternative embodiment of the system of FIG. 1 adapted to perform Hidden Markov Model global scoring.

The system of FIG. 4 utilizes an HMM template creator 100, an HMM template adapter 102, an HMM global scoring unit 104 and an HMM decision unit 106, respectively, rather than the template creator 26, the template adapter 32, the global scoring unit 34 and the decision unit 36 of FIG. 1. In addition, the system of FIG. 4 has no LPC and cepstrum determiner 33.

The HMM template creator 100 produces the HMM reference templates from the input autocorrelation feature sets of speech. As known in the art of HMM, each reference word is modelled by a sequence of states and the probability density function of the state is modelled as a mixture of multivariate, diagonal Gaussian probabilities. Both tied and non-tied mixtures can be used. Each mixture is characterized by a mean and variance over the acoustic feature space (for example, of dimension 22). The mixture parameters are estimated by a standard iterative K-means algorithm using a Viterbi alignment and form the basis for the reference template.

Initially, the HMM template creator 100 converts the input autocorrelation feature set $R_j$ into its cepstrum coefficients $C^*$, where the vector $C^*$ is defined in equation 4. In accordance with this second preferred embodiment of the present invention, the template creator 100 determines the time derivative of the cepstrum. Let $C+^*$ indicate the cepstrum for a "next frame". HMM template creator 100 then determines the time derivative $\Delta C^*$ as follows:

$$\Delta C^* = C^{+*} - C^* \tag{6}$$

The HMM template creator 100 then determines the mean and variance parameters for each mixture (in the cepstrum plane) and the cepstral mean $C_r^*$ of a mixture is inverse-transformed into an autocorrelation vector $R_r$. The template creator 100 then adds the cepstrum time derivative $\Delta C^*$ to the cepstral mean forming, thereby, a representation of the "next frame" cepstral mean $C_r^{*+}$, as follows:

$$C_r^{*+} = C_r^* + \Delta C_r^* \qquad (7)$$

The HMM template creator 100 then inverse transforms the next frame cepstral mean $C_r^{*+}$ to produce the "next frame" autocorrelation $R_r^+$. Finally, the feature set for the reference word is defined as $(R_r, R_r^+)$.

For each noisy speech frame under test, the HMM template adapter 102 takes as input the speech feature vector $R_r$ of the noisy speech frame, the stored background noise template $R_n$ and a feature vector $(R_r, R_r^+)$ of the reference template whose similarity to the speech feature vector is to be measured. The template adapter 102 noise-adapts the probabilities of the reference template. This is performed by adapting the means of the Gaussian mixtures to account for the additive noise. The variances are not adapted since the effect of the noise on them is small. For the cepstral means, the HMM template adapter 102 performs equation 2 on both elements (of the "current" and "next" frames) of the reference feature vector. Specifically:

$$R_r' = (<R_r(0)> - R_n(0))R_r + R_n R_r^{+'} = (<R_r(0)> - R_n(0))R_r^+ + R_n \qquad (8)$$

In addition, the HMM template adapter 102 adapts the cepstral derivative of the means. Initially, the adapter 102 converts the adapted reference feature vector $(R_r', R_r^{+'})$ of the reference template to their cepstral representatives $C_r^{*'}$ and $C_r^{*+'}$. The adapter 102 then adapts the cepstral derivative of the means as follows:

$$\Delta C_r^{*'} = C_r^{*+'} - C_r^{*'} \qquad (9)$$

The HMM template adapter 102 also produces the cepstral representation $C_r^*$ of the test feature set $R_r$.

The HMM global scoring unit 104 performs the HMM scoring operation on the cepstral feature sets $C_r^{*'}$, $C_r^{*+'}$, $C_r^{*'}$ and $C_r^*$. For each reference template i, the global scoring unit 104 produces a separate score $S_i$.

Finally, the HMM decision unit 106 adapts the scores $S_i$ produced by the global scoring unit 104 by normalizing each one by the average $<S_j>$ of the other scores. Thus, $$S_i' = S_i - <S_j>, \; i \neq j \qquad (10)$$

The HMM decision unit 106 selects the word whose adapted score $S_i'$ is best or is above a predetermined threshold level.

It will be appreciated by persons skilled in the art that the present invention is not limited to what has been particularly shown and described hereinabove. Rather the scope of the present invention is defined only by the claims which follow:

We claim:

1. A pattern recognition system comprising:

means for providing a test feature set of a generally noisy input signal characterizing at least a portion of an input pattern contained within said input signal;

means for providing a plurality of reference feature sets of reference templates produced in a quiet environment;

means for providing a background noise feature set of background noise present in said input signal;

a template adapter for producing adapted reference templates from said test feature set, said background noise feature set and said reference feature sets; and a global scoring unit for determining match scores defining the match between each of said adapted reference templates and said test feature set, wherein said feature sets are autocorrelation feature sets and said template adapter includes:

means for raising the gain level of a reference feature set to the value of the difference of the average energy of said test feature set and the average energy of said background noise feature set; and means for adjusting said gain-raised reference feature set by adding to it said background noise feature set thereby to create said adapted reference templates.

2. A pattern recognition system according to claim 1 and also including a signal to noise ratio determiner of the signal to noise ratio in the input signal and a decision unit for accepting at least one of said match scores if the signal to noise ratio and score value are within predetermined values.

3. A pattern recognition system according to claim 2 wherein said global scoring unit is a Dynamic Time Warping (DTW) global scoring unit.

4. A pattern recognition system according to claim 3 wherein said DTW global scoring unit operates on cepstral representations of said autocorrelation feature sets.

5. A pattern recognition system according to claim 1 wherein said global scoring unit is a Hidden Markov Model (HMM) global scoring unit.

6. A pattern recognition system according to claim 5 wherein said features sets are autocorrelation feature sets for the current frame and for another frame and wherein said HMM global scoring unit operates on cepstral representations of said feature sets for the current frame and on a cepstral difference between the cepstral representation of said feature sets for the current and another frame.

7. A pattern recognition system according to claim 6 and wherein said means for providing a plurality of reference feature sets includes:

means for producing cepstral representations of the autocorrelation feature sets of a plurality of frames of a plurality of reference signals and the cepstral difference between two frames of each reference signal;

means for determining the cepstral mean of a mixture of frames;

means for inverse-transforming the cepstral mean of said current frame into an autocorrelation vector for said current frame;

means for adding the cepstral mean of the current frame to said time difference and inverse-transforming the result thereby to produce an autocorrelation vector for said another frame; and means for generating said autocorrelation feature set from said autocorrelation vector of said current and another frame.

8. A pattern recognition system according to claim 7 wherein said adapted reference templates includes adapted reference templates of said current and another frame and wherein said template adapter includes means for generating an adapted cepstral difference from the cepstral representations of said adapted reference templates of said current and another frame.

9. A pattern recognition system according to claim 5 and also including a decision unit for accepting the best one of said match scores in accordance with a predetermined criterion.

10. A method for pattern recognition, the method comprising the steps of:

providing a test feature set of a generally noisy input signal characterizing at least a portion of an input pattern contained within said input signal;

providing a plurality of reference feature sets of reference templates produced in a quiet environment;

providing a background noise feature set of background noise present in said input signal;

producing adapted reference templates from said test feature set, said background noise feature set and said reference feature sets; and determining match scores defining the match between each of said adapted reference templates and said test feature set wherein said feature sets are autocorrelation feature sets and said step of producing includes the steps of:

raising the gain level of a reference feature set to the value of the difference of the average energy of said test feature set and the average energy of said background noise feature set; and adjusting said gain-raised reference feature set by adding to it said background noise feature set thereby to create said adapted reference templates.

11. A method according to claim 10 and also including the steps of determining a signal to noise ratio in the input signal and accepting at least one of said match scores if the signal to noise ratio and score value are within predetermined values.

12. A method according to claim 11 wherein said step of determining performs Dynamic Time Warping (DTW).

13. A method according to claim 12 wherein said step of determining operates on cepstral representations of said autocorrelation feature sets.

14. A method according to claim 10 wherein said step of determining performs Hidden Markov Model (HMM) scoring.

15. A method according to claim 14 wherein said features sets are autocorrelation feature sets for the current frame and for another frame and wherein said step of determining operates on the cepstral representations of said autocorrelation feature sets for the current frame and on a cepstral difference between the cepstral representations of said feature sets for the current and another frame.

16. A method according to claim 15 and wherein said step of providing a plurality of reference feature sets includes the steps of:

producing cepstral representations of the autocorrelation feature sets of a plurality of frames of a plurality of reference signals;

producing the cepstral difference between two frames of each reference signal;

determining the cepstral mean of a mixture of frames;

inverse-transforming the cepstral means of said current frame into an autocorrelation vector for said current frame;

adding the cepstral means of the current frame to said time difference and inverse-transforming the result thereby to produce an autocorrelation vector for said another frame; and generating said autocorrelation feature set from said autocorrelation vector of said current and another frame.

17. A method according to claim 16 wherein said adapted reference templates includes adapted reference templates of said current and another frame and wherein said step of producing includes the steps of raising the gain level of a reference feature set to the value of the difference of the average energy of said test feature set and the average energy of said background noise feature set and adjusting said gain-raised reference feature set by said background noise feature set thereby to create said adapted reference templates of said current and includes the step of generating an adapted cepstral difference from the cepstral representations of said adapted reference templates of said current and another frame.

18. A method according to claim 17 and also including the step of accepting the best one of said match scores in accordance with a predetermined criterion.

\* \* \* \* \*